W. C. ROBINSON.
AEROPLANE FUSELAGE STRUCTURE.
APPLICATION FILED MAR. 27, 1916.
1,222,140.
Patented Apr. 10, 1917.
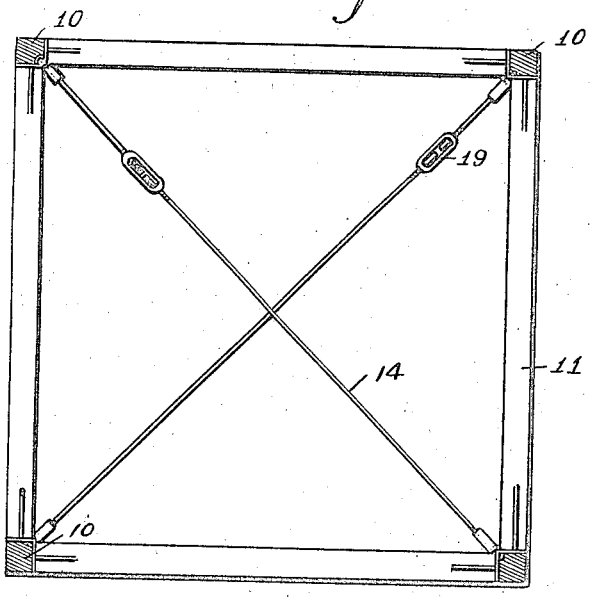
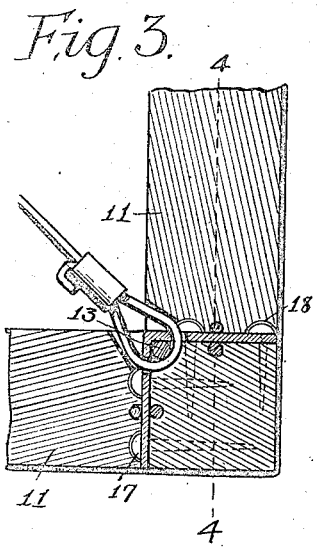
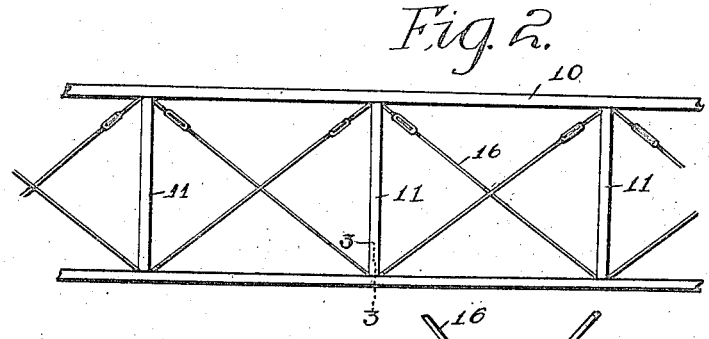
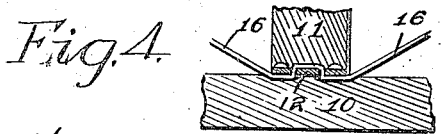
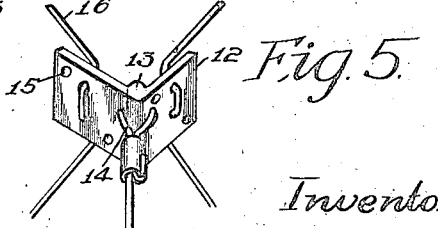
Witness
A. J. Hague
Inventor
Wm. C. Robinson
by Orwig & Bair Attys

UNITED STATES PATENT OFFICE.

WILLIAM C. ROBINSON, OF GRINNELL, IOWA.

AEROPLANE-FUSELAGE STRUCTURE.

1,222,140.  Specification of Letters Patent.  Patented Apr. 10, 1917.

Application filed March 27, 1916. Serial No. 87,115.

*To all whom it may concern:*

Be it known that I, WILLIAM C. ROBINSON, a citizen of the United States, and resident of Grinnell, in the county of Poweshiek and State of Iowa, have invented a certain new and useful Aeroplane-Fuselage Structure, of which the following is a specification.

In the construction of the fuselage or body of aeroplanes, it has been common to employ four longitudinal members and a series of transverse struts or compression members at intervals throughout the length of the longitudinal members. In such structures it is necessary to form very strong and durable connections between the longitudinal members and the struts or compression members. Furthermore, it has also been common heretofore to employ tension wires or rods connecting the longitudinal members at points to hold them firmly against the struts or compression members.

In aeroplanes the fuselage is subjected to very great strains in almost every direction, and it is therefore of prime importance that the connections between the parts of the fuselage be strong and durable.

My object is to provide means for connecting together the longitudinal pieces and the struts or compression members in such a manner that the ends of the compression members do not receive any nails or screws or the like which tend to split them, so that the maximum strength of the material at the ends of the struts is preserved.

A further object is to provide a fuselage structure of this kind in which the sole function of the strut members is to take the compression strains, and the brace wires or rods take all of the tension strains.

A further object is to provide an improved connecting plate especially designed to receive the ends of the various compression members and hold them against longitudinal movement relative to the plates, and also to receive and anchor the various tension wires or rods in such manner that all of the tension strains are borne by the tension wires or rods, and the struts are only subjected to compression strains and are thereby firmly and securely held in place without nails or screws in their ends, by the joint action of the connecting plates and the tension wires or rods.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a transverse, sectional view through an aeroplane fuselage embodying my invention.

Fig. 2 shows a side elevation of a part of an aeroplane fuselage embodying my invention.

Fig. 3 shows an enlarged, detail, sectional view on the line 3—3 of Fig. 2.

Fig. 4 shows a detail, sectional view on the line 4—4 of Fig. 3, and

Fig. 5 shows a detail, perspective view of one of my improved connecting plates, with the various tension wires or rods attached thereto.

Referring to the accompanying drawings, I have used the reference numeral 10 to indicate the longitudinal fuselage members. These are preferably made of wood, rectangular in cross section. The strut members are indicated by the numeral 11. These are also preferably made of wood, rectangular in cross section. There are usually four of the longitudinal members and at intervals throughout their length there are strut members arranged in rectangular form, as shown in Fig. 1, extending between all of the longitudinal members.

For connecting these fuselage members together, I employ a series of plates 12, each being formed of a single piece of sheet metal bent at its central portion so that its two sides are at right angles to each other. In order to add strength to the part of this plate that is subjected to the greatest strains, I preferably place a steel rod 13 at the corner of the plate on the inside and secure this rod in position by brazing or otherwise. I also provide two openings in the plate 12 to receive a wire loop 14, which wire encircles the rod 13. Each side of the plate is provided with one or more screw openings 15, and each side of the plate is also provided near its central portion with two openings to receive tension wires 16. These wires, as clearly shown in Fig. 4, extend first along the inner side of the plate, then outwardly through one of said openings, then along the outer side of the plate and then inwardly through the other opening, and then along the inner side of the plate to a point beyond the plate. By this means the tension wire is firmly secured to the plate, and on account of the two sharp angles formed therein, relative movement of the tension wire relative to the plate is prevented.

In assembling the device, I provide a series of these plates and secure them to the longitudinal members 10 at points where the struts are to be placed. Before securing them in position the tension wires 16 are extended through the openings in the plates. I preferably employ screws 17 for securing these plates to the longitudinal fuselage members, the heads of which screws project outwardly from the plates. The strut members have recesses formed in their ends, as illustrated at 18 in Fig. 3, to receive the heads of these screws so that the ends of the struts may bear directly upon the plates and so that the heads of the screws being received in said recesses will prevent sliding movements of the ends of the struts relative to the plates.

The various tension wires 14 extend diagonally transversely of the fuselage, as shown in Fig. 1, and the various tension wires 16 extend diagonally longitudinally of the fuselage, as shown in Fig. 2. The ends of the various tension wires are threaded and connected by means of turn buckles 19 in the ordinary manner.

In practical use it is obvious that by means of my improved construction the parts of the fuselage frame may be assembled very readily and easily, as it is only necessary to attach the plates to the fuselage members by means of screws. Before these plates are attached the various tension wires are permanently connected with them, as before stated. Then the struts are placed in position, the wires connected and the turn buckles tightened up, whereupon the connections between the parts of the fuselage are completed.

One of the advantages of my improved construction is that all of the tension strains on the wires are thrown directly upon the connecting plates at the centers of the various strut ends, and none of the strains to which these devices are ordinarily subjected tend in any way to move the struts longitudinally or laterally, and I have found that by having the heads of the screws 17 inserted in recesses in the ends of the struts it is made unnecessary to have any bolts, screws, nails or other fastening devices inserted in the ends of the strut members. Furthermore, by my improved construction all of the tension strains are carried by the tension wires or rods, and only compression strains are applied to the struts. The longitudinal members only serve to space the struts apart and give rigidity to the entire fuselage.

I claim as my invention:

1. In an aeroplane fuselage, the combination of longitudinal fuselage members, a series of transverse struts, a series of plates between said longitudinal members and said struts, each plate being provided with one portion to enter between a vertical strut member and one of the longitudinal members, and also a portion to enter between one of the horizontal strut members and a longitudinal member, said plate also being provided near its central portion with openings, a transverse tension wire in said openings, said plate also being provided with openings near the central portions of both of its members, longitudinal tension wires extended through said openings, and screws extended through both members of said plate into the said longitudinal member, the heads of said screws projecting from the outer surface of the plate, and said strut members being provided with recesses to receive said screw heads.

2. In an aeroplane fuselage, the combination of four longitudinal fuselage members, a series of strut members extending transversely of the fuselage, means for connecting the fuselage members, said means comprising a series of plates, each comprising two portions at right angles to each other and each plate being provided near its center with two openings on opposite sides of the center and each side of said plate being also provided with two openings, screws passed through the plate and into the longitudinal fuselage member with their heads projecting beyond the plates, said strut members being arranged with their ends resting on said plates and being provided with recesses to receive said screw heads, a series of transverse tension wires passed through the openings near the center of said plates, means for connecting together and adjusting the tension of said transverse wires, a series of longitudinal tension wires, each being extended first under the plates and then outwardly through one of the openings and then inwardly through another opening, and means for connecting together and adjusting the tension of said longitudinal tension wires, for the purposes stated.

3. In an aeroplane fuselage, the combination of four longitudinal fuselage members, a series of strut members extending transversely of the fuselage, means for connecting the fuselage members, said means comprising a series of plates, each comprising two portions at right angles to each other and each plate being provided near its center with two openings on opposite sides of the center and each side of said plate being also provided with two openings, screws passed through the plate and into the longitudinal fuselage member with their heads projecting beyond the plates, said strut members being arranged with their ends resting on said plates and being provided with recesses to receive said screw heads, a series of transverse tension wires passed through the openings near the center of said plates, means for connecting together and adjusting the tension of said transverse wires, a series of longitudinal tension wires, each being extended first under the plates and then outwardly through one of the openings and then inwardly through another opening, means for connecting together and adjusting the tension of said longitudinal tension wires, and a metal rod inserted in the corner of each of said plates between the said central openings thereof, and secured thereto and having the transverse tension wires passed around, for the purposes stated.

Des Moines, Iowa, March 2, 1916.

WILLIAM C. ROBINSON.

Copies of this patent may be obtained for five cents each, by addressing the "Commissioner of Patents, Washington, D. C."